Patented Aug. 1, 1933

1,920,846

UNITED STATES PATENT OFFICE 1,920,846

PREPARATION OF ALKYL HALIDES

Herbert W. Daudt, Wilmington, Del., assignor to E. I. du Pont de Nemours & Company, Wilmington, Del., a Corporation of Delaware No Drawing. Application October 2, 1930
Serial No. 486,061

24 Claims. (Cl. 260—166)

This invention relates to organic compounds and more particularly to the preparation of alkyl halides. It particularly contemplates such a process in which mixtures of alkyl ethers and hydro-halide acids are reacted in the presence of a catalyst.

It is an object of this invention to devise a novel process for the production of alkyl halides. Other objects are the production of alkyl halides from ethers and a general advancement of the art. Other objects will appear hereinafter.

In general these objects are accomplished by the present invention whereby a gaseous mixture containing the vapors of an ether and a hydro-halide acid are passed over a heated oxygen containing catalyst. In the place of the hydro-halide acid a mixture of a hydrogen halide and water vapor may be used. The invention will be readily understood from a consideration of the following examples in which the parts are given by weight.

Example I

The catalyst in this case, aluminum oxide, was placed in a suitable vessel and heated to about 360° C. While maintained at this temperature there was passed over it continuously a mixture of the vapors formed by vaporization of a body of ethyl ether and a body of aqueous hydrochloric acid having a specific gravity of 1.2.

A ratio of seven parts by volume of ether vapor to twelve parts of the hydrochloric acid vapors was maintained throughout the reaction. After passing over the catalyst the effluent vapors were passed through a water cooled condenser, a caustic scrubber, a sulphuric acid drying scrubber and into a brine cooled condenser in the order named. From the brine cooled condenser liquid ethyl chloride was obtained. A yield of about 50% of ethyl chloride based upon the amount of ethyl ether used was obtained.

Hydrated aluminum oxide (the catalyst) in the form usually supplied to the trade is a light, fluffy powder and is not well suited for use in this reaction wherein vapors are ordinarily passed rapidly over the catalyst surface. It is therefore desirable to prepare the catalyst in a form more suited to such a process as herein employed. This has been done by producing the catalyst in the form of small pellets. In the preparation of the catalyst in this form the dry powder may be compacted by high pressure or may be mixed with an inorganic binding or cementing agent. In the latter case the slightly pasty product resulting from mixing a binding agent and the catalyst may be pressed into a mold or extruded through a die in any desired form. The catalyst thus molded is usually dried, whereupon it is ready for service. The preparation of the catalyst in this form will be readily understood from a consideration of the following example:

Example II

Fifteen (15) parts of hydrated aluminum oxide were intimately mixed with 7 parts of 40° Bé. sodium silicate solution. The resultant mixture was pressed by means of a die into small pellets one-fourth inch in diameter by one-eighth inch in thickness. These pellets were then dusted with the powdered hydrated aluminum oxide and allowed to dry at atmospheric temperature for eight hours, after which they were dried at 175° for twelve hours.

The catalyst was then ready for use in the process for the preparation of alkyl halides as described above.

Example III

Fifteen (15) parts of hydrated aluminum oxide were intimately mixed with 7 parts of 40° Bé. sodium silicate solution. The resultant mixture was extruded through a die into lengths about one-eighth inch in diameter. These lengths were then dusted with the powdered hydrated aluminum oxide and allowed to dry at atmospheric temperature for eight hours, after which they were dried at 175° for twelve hours. The catalyst was then ready for use in the process for the preparation of alkyl halides as described above.

The catalyst prepared as above described is hard, compact, and can be used indefinitely for the preparation of alkyl chlorides.

The preparation of the catalyst in pellets or lengths may be varied over a wide range. It is only necessary to have the mixture of such a consistency that it can be worked into the desired physical form. Bodies of the catalyst molded without the use of pressure are suitable for the successful operation of this process. It is not necessary that the particles be of uniform size or of any particular size. Widely varying shapes and sizes may be used. The procedure for drying may be varied as desired, another example being the use of the catalyst as soon as molded.

Inorganic binders other than sodium silicate may be used or mixtures of binders may be used. The desirable features of a binding material are, first, that it should maintain its efficacy under the temperature conditions of the process and; second, that it should not adversely influence the conversion reaction for which the catalyst is used. Phosphoric acid may be used in the place of the sodium silicate. Its use is described in the following example:

*Example IV*

Hydrated aluminum oxide was mixed with sufficient (85%) phosphoric acid to cause the particles to adhere to each other. The mass was then formed into small pellets and dried at 270° C., after which they were ready for use.

Other alkali silicates than that of sodium may be used, for example, potassium silicate is suitable.

The invention is not limited to hydrated aluminum oxide. In general, oxides or oxygen containing inorganic salts which have the property of causing dehydration of an alcohol are suitable, more particularly, the oxygen containing compounds of the metals of groups III and IV of the Periodic Table (for example, that in the Handbook of Chemistry and Physics, 12th Edition, 1927, pages 474–475). Excellent results are obtainable with compounds embodying thorium, zirconium, titanium and aluminum. Oxides or sulphates of these metals, in particular, may be used. Preferably, hydrated aluminum oxide is used. Special mention may also be made of aluminum sulphate having the formula $Al_2(SO_4)_3$. The term oxide is used broadly to cover both hydrated and anhydrous oxides, where it is intended to cover either to the exclusion of the other, its full name is employed.

It is to be understood that the term "hydrated oxide catalyst" as used herein is to be considered as covering hydroxide catalysts. Under certain systems of nomenclature these oxide compounds may be considered to be hydroxides.

By the term "hydrochloric acid" it is intended to cover the chemical compound hydrogen chloride associated with water. By the term "hydrogen chloride" it is intended to cover the anhydrous chemical compound hydrogen chloride. By the term "hydro-halide acid" it is intended to cover acids similar to hydrochloric acid which involve other halogens.

The process is not limited to the use of ethyl ether or hydrochloric acid, the compounds mentioned in the above examples. Other alkyl ethers and other hydro-halide acids may be used. Excellent results are obtainable with methyl ether.

The ether, as indicated above, may be used alone or it may be used in admixture with small amounts of other materials. These other materials may or may not form alkyl halides under the conditions described. As an example of such materials, alcohols may be mentioned.

The method of adding the components may be accomplished in any desired manner, for example, the vapors of the hydro-halide acid may be passed through a liquid body of the ether or vice versa. The proportions of the components may be varied from that given in the above examples but preferably an excess of the hydrogen halide acid is maintained. If desired, hydrogen chloride or other hydrogen halide gas may be passed over the catalyst in connection with the ether vapor but in such a case it is beneficial to admix the same with water vapor.

The rate of flow of the gases may vary as desired.

Temperatures between 300 and 370° C. for the reaction have given excellent results but it is to be understood that conversions may be obtained over a wider range for example a range as broad as 280 to 400° C. Temperatures above 400° C. favor the production of excessive proportions of ethylene. In certain instances it is advantageous to use pressures in excess of atmospheric. Greater yields may be obtained when the process (for instance that of Example I) is carried out under pressures greater than atmospheric. While in general any super-atmospheric pressure may be used, a desirable range is 15 to 20 atmospheres. With high pressures a retention of the materials and consequent economy is effected.

As many apparently widely different embodiments of this invention may be made without departing from the spirit and scope thereof it is to be understood that I do not limit myself to the specific embodiments thereof except as defined in the appended claims.

I claim:

1. The method of producing ethyl chloride which comprises passing ethyl ether and hydrochloric acid, said acid being present in an amount which is in excess of that required to molecularly combine with the ether used, over aluminum oxide heated to about 360° C.

2. The method of producing ethyl chloride which comprises passing ethyl ether and hydrochloric acid, said acid being present in an amount which is in excess of that required to molecularly combine with the ether used, over aluminum oxide heated to about 300° C. to about 370° C.

3. The method of producing ethyl chloride which comprises passing ethyl ether and hydrochloric acid, said acid being present in an amount which is in excess of that required to molecularly combine with the ether used, over aluminum oxide heated to about 280° C. to about 400° C.

4. The method of producing ethyl chloride which comprises passing ethyl ether and hydrochloric acid over aluminum oxide heated to about 280° C. to about 400° C.

5. The method of producing ethyl chloride which comprises passing ethyl ether and hydrochloric acid under superatmospheric pressure over aluminum oxide heated to about 280° C. to about 400° C.

6. The method of producing ethyl chloride which comprises passing ethyl ether and hydrochloric acid, said acid being present in an amount which is in excess of that required to molecularly combine with the ether used, under superatmospheric pressure over aluminum oxide heated to about 280° C. to about 400° C.

7. The method of producing ethyl chloride which comprises passing ethyl ether and hydrochloric acid over aluminum oxide maintained at a temperature in excess of 280° C.

8. The method of producing ethyl chloride which comprises passing ethyl ether and hydrochloric acid over an oxygen containing inorganic compound of a metal of groups III and IV of the Periodic Table heated to about 280° C. to about 400° C.

9. The method of producing ethyl chloride which comprises passing ethyl ether and hydrochloric acid over aluminum oxide heated to about 360° C.

10. The method of producing ethyl chloride which comprises passing ethyl ether and hydrochloric acid, said acid being present in an amount which is in excess of that required to molecularly combine with the ether used, over aluminum oxide heated to about 360° C. under pressure in excess of atmospheric.

11. The method of producing alkyl chlorides which comprises passing an alkyl ether and hydrochloric acid, said acid being present in an amount which is in excess of that required to molecularly combine with the ether used, over aluminum oxide heated to about 280° C. to about 400° C.

12. The method of producing alkyl chlorides containing less than 3 carbon atoms which comprises passing an alkyl ether and hydrochloric acid, said acid being present in an amount which is in excess of that required to molecularly combine with the ether used, over aluminum oxide heated to about 280° C. to about 400° C.

13. The method of producing alkyl chlorides which comprises passing an alkyl ether, hydrogen chloride and added water, said acid being present in an amount which is in excess of that required to molecularly combine with the ether used, over aluminum oxide heated to about 280° C. to about 400° C.

14. The method of producing alkyl chlorides which comprises passing an alkyl ether, hydrogen chloride and added water, said acid being present in an amount which is in excess of that required to molecularly combine with the ether used, under superatmospheric pressure over aluminum oxide heated to about 280° C. to about 400° C.

15. The method of producing alkyl chlorides which comprises passing an alkyl ether, hydrogen chloride and water vapor, over aluminum oxide heated to about 280° C. to about 400° C.

16. The process which comprises passing a mixture of the vapor of ethyl ether and that formed by heating aqueous hydrochloric acid having a specific gravity of 1.2, in the the ratio of 7 parts to 12 parts respectively, over aluminum oxide heated to about 360° C., passing the resulting vapors successively through a water cooler, a caustic scrubber, a sulphuric acid drying scrubber, and condensing the ethyl chloride formed.

17. The method of producing alkyl halides which comprises passing an alkyl ether and the corresponding hydro-halide acid over aluminum oxide heated to 280 to 400° C.

18. The process of claim 17 in which the hydro-halide acid is hydrobromic acid.

19. The process of claim 17 in which the hydro-halide acid is hydrobromic acid and in which the temperature does not exceed 360° C.

20. The method of producing alkyl chlorides which comprises passing an alkyl ether and hydrochloric acid over aluminum oxide heated from about 280° C. to about 400° C. the amount of said acid present corresponding to a molecular concentration in excess of that of the amount of the ether present.

21. The method of producing ethyl chloride which comprises passing ethyl ether and hydrochloric acid over a member of the group consisting of the oxides and sulphates of aluminum heated from about 280° C. to about 400° C.

22. The method of producing ethyl chloride which comprises passing ethyl ether and hydrochloric acid over a member of the group consisting of the oxides and sulphates of titanium heated from about 280° C. to about 400° C.

23. The method of producing ethyl chloride which comprises passing ethyl ether and hydrochloric acid over a member of the group consisting of the oxides and sulphates of thorium heated from about 280° C. to about 400° C.

24. The method of producing ethyl chloride which comprises passing ethyl ether and hydrochloric acid over a member of the group consisting of the oxides and sulphates of a metal of Group IV of the Periodic Table heated from about 280° C. to about 400° C.

HERBERT W. DAUDT.